March 31, 1925.

J. BOWEN

BALL BEARING CASTER

Filed Feb. 28, 1923    2 Sheets-Sheet 1

1,532,033

Inventor:
James Bowen
by his Attorneys,
Howson & Howson

March 31, 1925. 1,532,033
J. BOWEN
BALL BEARING CASTER
Filed Feb. 28, 1923 2 Sheets-Sheet 2
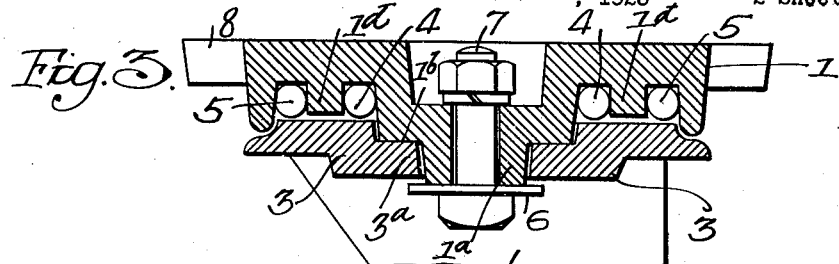
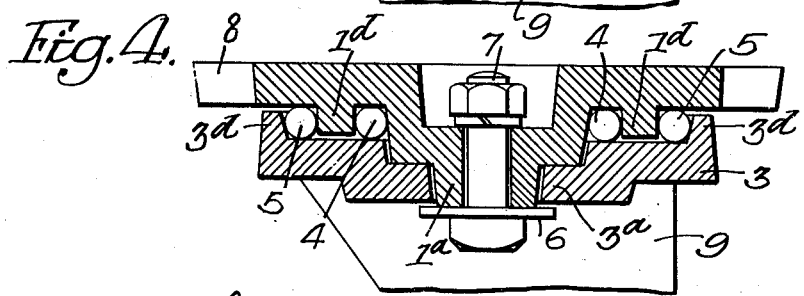
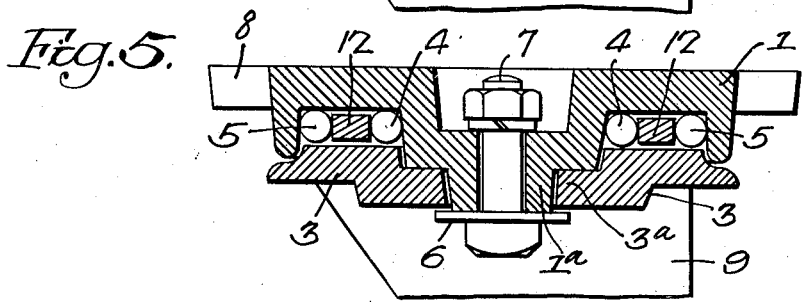
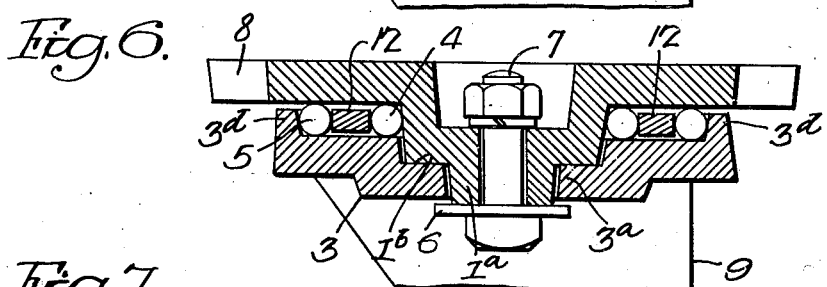
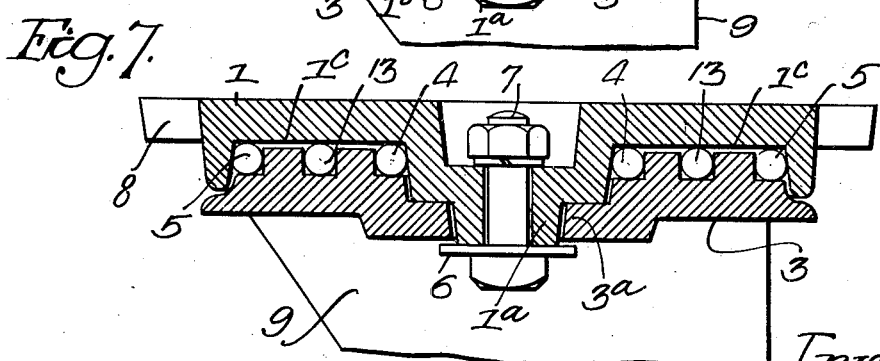
Inventor.
James Bowen.
by his Attorneys
Howson & Howson Patented Mar. 31, 1925.

1,532,033

UNITED STATES PATENT OFFICE.

JAMES BOWEN, OF MANHEIM, PENNSYLVANIA, ASSIGNOR TO BOND FOUNDRY AND MACHINE COMPANY, OF MANHEIM, PENNSYLVANIA, A CORPORATION OF PENNSYLVANIA.

BALL-BEARING CASTER.

Application filed February 28, 1923. Serial No. 621,760.

*To all whom it may concern:*

Be it known that I, JAMES BOWEN, a citizen of the United States, residing in Manheim, Lancaster County, Pennsylvania, have invented a Ball-Bearing Caster, of which the following is a specification.

Figure 1:
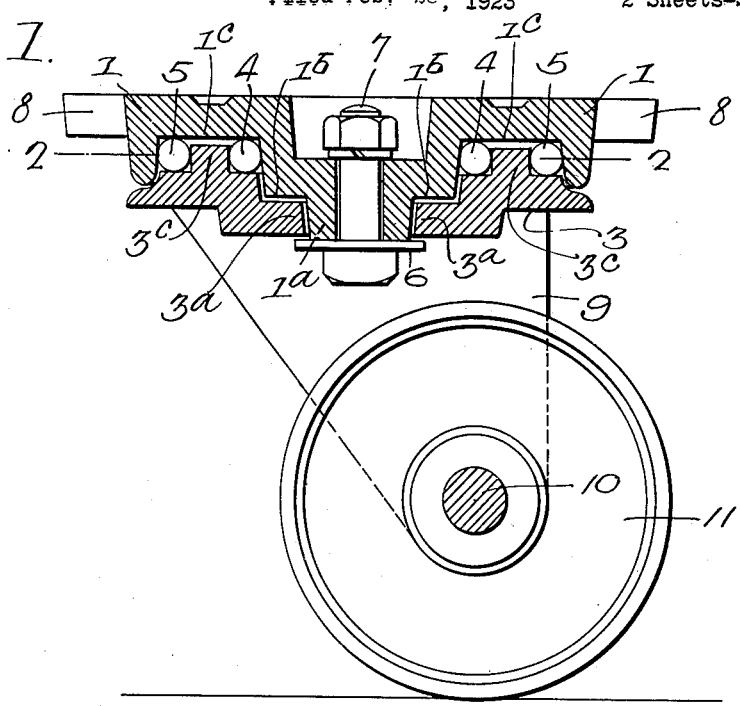
Figure 2:
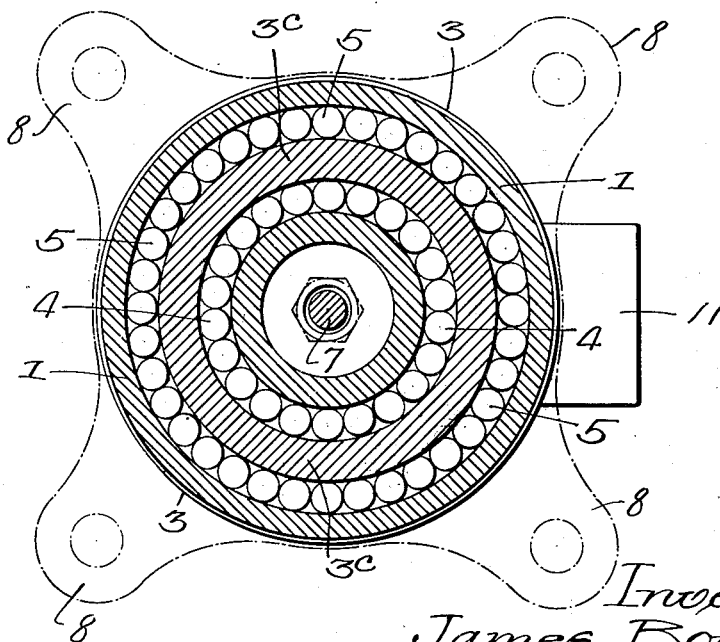

My invention relates to ball-bearing casters such as are used on trucks, refrigerators and other heavy objects, and one object of my invention is to so construct such a caster that it will be economical to manufacture, simple to assemble and, in use, be capable of carrying relatively heavy loads with perfect flexibility and easy operation. These objects I attain as hereinafter set forth, reference being had to the accompanying drawings, in which, Fig. 1 is a vertical sectional view of a ball-bearing caster constructed in accordance with my invention;

Fig. 2 is a transverse sectional view on the line 2—2, Fig. 1; and

Figs. 3 to 7 inclusive, are views similar to a portion of Fig. 1, illustrating various modifications of my invention.

The caster illustrated in Figs. 1 and 2 consists, primarily, of two substantially annular plates or members 1 and 3, between which are interposed two series of balls 4 and 5, each so disposed as to provide both vertical and lateral anti-friction elements between the members 1 and 3. Said members are maintained in proper vertical relation to one another by means of a washer 6 secured against a depending central boss $1^a$ on the member 1 by means of a king bolt 7, and the member 3 is provided with a centrally projecting flange $3^a$ which is loosely confined between the upper face of said washer 6 and an appropriately formed annular shoulder $1^b$ on the member 1.

Projecting from the member 1 are a plurality of apertured ears 8 by means of which said member may be secured to the bottom of the object to which the caster is applied and depending from the member 3 are legs or brackets 9 which at their lower extremities, carry a transverse shaft 10. On this latter is mounted the wheel or roller 11 of the caster.

The raceways for the two series of balls 4 and 5 are provided by an annular groove $1^c$ in the member 1, into the center of which an annular rib $3^c$ projects from the member 3. This rib serves as a spacing ring between the two series of balls, the balls of the series 4 being confined between said rib and the inner wall of the groove $1^c$, and the balls of the series 5 being confined between the rib and the outer wall of the groove $1^c$. As a result of being thus confined, laterally, between the opposite faces of the rib and the walls of the groove, the two series of balls constitute lateral antifriction bearings as effective as is their vertical antifriction bearing. The device is thus adapted to take lateral thrust from any direction and the caster will quickly respond as well as move freely in any direction.

In certain cases the feature of the lateral antifriction bearing between the two members may be subordinate to that of the vertical bearing and in such cases I may utilize the construction illustrated in Figs. 3, 4, 5 or 6, wherein the feature of lateral bearing is either eliminated or subordinated, other features of the invention being retained as previously described in connection with Figs. 1 and 2.

In Fig. 3 is illustrated a construction in which the annular rib $3^c$ is eliminated, the upper and bearing face of the member 3 being flat. In this instance an annular rib $1^d$ integral with the member 1 is employed. This rib projects into the center of the ball-receiving groove in the member 1 and has the effect of dividing it, substantially, into two grooves, one of which receives the balls 4 of the inner series while the other receives the balls 5 of the outer series. In this construction the vertical ball-bearing between the two members is the same as before described but there is no lateral ball bearing therebetween, the member 1 furnishing said bearings for all of the balls of both series.

In Fig. 4 is illustrated a construction which is similar to that shown in Fig. 3 with the exception that the outer side bearing for the balls 5 of the outer series is furnished by an upstanding annular rib $3^d$ on the member 3, the lower bearing face of the member 1 being flat outwardly beyond the rib 1ᵈ. In this construction the vertical ball bearing between the two members is furnished by both series of balls, while lateral ball bearing therebetween is furnished by the balls 5, of the outer series.

In Fig. 5 is illustrated a construction which is similar, both structurally and in function, to that shown in Fig. 3, with the exception that the integral spacing rib 1ᵈ is omitted a separate spacing ring 12 being employed instead. In this construction there is no lateral ball bearing between the members.

In Fig. 6 is illustrated a construction which bears the same relation to that shown in Fig. 4 as does the construction shown in Fig. 5 to that shown in Fig. 3. That is to say, the only difference is the substitution of the separate spacing ring 12 for the integral rib 1ᵈ. In this construction lateral bearing is had between the two members through the joint action of the balls of both series and the intervening ring, the flange 3ᵈ furnishing the inner side bearing therefor.

In Fig. 7 is illustrated a construction which is a modification of that shown in Figs. 1 and 2 and is designed to sustain exceptionally heavy loads. In this construction, the groove 1ᶜ in the member 1 is of such width as to accommodate three series of balls, the balls 4 and 5 of the inner and outer series being reinforced by the introduction of balls 13 of an intermediate series. To provide for these three series of balls the member 3 is equipped with a supplementary annular rib 3ᵉ similar in function to the rib 3ᶜ. In this construction, the balls 4 and 5 of the inner and outer series furnish both vertical and lateral ball bearing between the two members 1 and 3 and the balls 13 of the intermediate series furnish additional vertical ball bearing therebetween.

More than these three series of balls may be employed, if desired, a mere duplication of parts being all that would be necessary. This, as well as other obvious variations in construction, will readily suggest themselves to any one skilled in the art, and hence require no further special illustration or description.

The term anti-friction elements used in the claims covers balls or their equivalents.

I claim:

1. In a caster, the combination of a caster wheel, a lower swivel plate with which the wheel is rotatably connected, the said plate having a large central circular aperture in its upper part, an upper fixed plate having a central integral boss projecting into and approximately fitting the said aperture, means carried by the fixed plate and engaging the swivel plate to prevent the separation of the latter from the former, two concentric annular rows of bearing balls located in the same plane and interposed between and directly engaging horizontal surfaces on the two plates with the inner row also directly engaging the said boss, an annular flange on one of the plates surrounding and engaging the outer row of balls, and an annular separating means between the two rows of balls.

2. In a caster, the combination of a caster wheel, a lower swivel plate with which the wheel is rotatably connected, the said plate having a large central circular aperture extending through it and having an annular flange projecting inward at the bottom of the aperture, an upper fixed plate having a central integral boss projecting into and approximately fitting the said aperture and provided with an annular shoulder approximately fitting the upper surface of the said flange, means carried by the boss and engaging the swivel plate to prevent the separation of the latter from the former, two concentric annular rows of bearing balls interposed between and directly engaging horizontal surfaces of the two plates with the inner row also directly engaging the said boss, an annular flange on one of the plates surrounding and engaging the outer row of balls, and an annular separating means between the two rows of balls.

3. In a caster, the combination of a caster wheel, a lower swivel plate with which the wheel is rotatably connected, the said plate having a large central circular aperture extending through it and having an annular flange projecting inward at the bottom of the aperture, an upper fixed plate having a central integral boss projecting into and approximately fitting the upper part of said aperture and provided with an annular shoulder approximately fitting the upper surface of the said flange, a vertical bolt extending through a central aperture in the hub, a washer held in place by the bolt at the lower end and engaging the swivel plate to hold it in operative relation to the fixed plate, a nut at the upper end of the bolt located in a recess below the top surface of the fixed plate, two concentric annular rows of bearing balls located in the same plane and interposed between and directly engaging horizontal surfaces on the two plates with the inner row also directly engaging the said boss, an annular flange on one of the plates surrounding and engaging the outer row of balls, and an annular separating means between the two rows of balls.

4. In a caster, the combination of a caster wheel, a lower swivel plate with which the wheel is rotatably connected, the said plate having a large central circular aperture in its upper part, an upper fixed plate having a central integral boss projecting into and approximately fitting the said aperture, means carried by the fixed plate and engaging the swivel plate to prevent the separation of the latter from the former, two concentric annular rows of bearing balls interposed between and directly engaging horizontal surfaces on the two plates with the inner row also directly engaging the said boss, an integral annular flange depending from the fixed plate and surrounding and engaging the outer row of balls, and an integral annular rib on the swivel plate serving as a separating means between the two rows of balls.

JAMES BOWEN.